United States Patent [19]

Ju

[11] Patent Number: 5,261,061
[45] Date of Patent: Nov. 9, 1993

[54] REMOTE MAINTENANCE AND ADMINISTRATION METHOD IN A SWITCHBOARD SYSTEM

[75] Inventor: Cheol Ju, Kwachun, Rep. of Korea

[73] Assignee: SamSung Electronics Co., Ltd., Suwon, Rep. of Korea

[21] Appl. No.: 928,669

[22] Filed: Aug. 17, 1992

Related U.S. Application Data

[63] Continuation of Ser. No. 400,947, Aug. 31, 1989, abandoned.

[30] Foreign Application Priority Data

Aug. 31, 1988 [KR] Rep. of Korea ............... 1988-11210

[51] Int. Cl.⁵ .................. G06F 13/00; G06F 11/00
[52] U.S. Cl. ............... 395/325; 364/DIG. 2; 364/919; 364/919.4; 364/933.9; 364/948.1; 364/222.3; 364/232.9; 371/18
[58] Field of Search ............ 395/325, 575, 200; 371/18; 379/90, 93, 96

[56] References Cited

U.S. PATENT DOCUMENTS

| | | | |
|---|---|---|---|
| 4,282,399 | 8/1981 | Kippenhan, Jr. et al. | 364/200 |
| 4,356,545 | 10/1982 | West | 364/200 |
| 4,701,845 | 10/1987 | Andreasen et al. | 364/200 |
| 4,962,449 | 10/1990 | Schlesinger | 364/200 |
| 4,989,176 | 1/1991 | Khan | 364/900 |

Primary Examiner—Eddie P. Chan
Attorney, Agent, or Firm—Robert E. Bushnell

[57] ABSTRACT

There is disclosed a method capable of maintaining and administering remotely a switchboard at each site with a computer in the remote switching operation center which gets through a public switching telephone network (PSTN). The improvement allows that a loading file and a mail file are mutually transmitted between a computer in the remote switching operation center and a switchboard at each site, and that a data conversation function is performed between a computer in the remote switching operation center and a maintenance and administration (M & A) terminal installed in the switchboard at each site.

11 Claims, 6 Drawing Sheets

REMOTE MAINTENANCE AND ADMINISTRATION METHOD IN A SWITCHBOARD SYSTEM

This is a continuation of application Ser. No. 07/400,947 filed on Aug. 31, 1989 now abandoned.

BACKGROUND OF THE INVENTION

The present invention relates to a switchboard remote maintenance and administration method and, in particular, to a method by which to maintain and administer a switchboard at the computer terminal of remote operation center.

Usually, a switchboard is equipped with a M & A terminal (Maintenance and Administration Terminal) for its maintenance and administration. The M & A terminal installed in said switchboard facilitates the maintenance, administration and operation of switchboard by means of MMC (Man-Machine Communication) between the switchboard and its terminal.

By means of MMC between said M&A terminal and switchboard, the maintenance and administration of the system can be facilitated through input and output of various information such as system data, subscriber's data, output and change of junction line data, request for various traffic-related information output, system fault information output, telephone number according to service by subscriber, service function, register and cancellation of correspondence.

When a professional operator is permanently stationed at the location of switchboard equipped with said M & A terminal, the operation of such a switchboard can be free from restraint.

In recent times, however, there are many instances in which no professional operator is permanently stationed at the site where a switchboard is installed in consideration of personnel expenses. Thus, it involves a problem when a professional operator is required for the maintenance and administration of switchboard.

And, even when there is a professional switchboard operator stationed at the site, a usual operator has manually outputted, judged, maintained and operated the condition of switchboard through the M & A terminal thereof.

Accordingly, it has been possible to maintain and administer a telephone exchange system only when a professional operator is permanently stationed at the site where it is installed.

OBJECT OF THE INVENTION

Thus, an object of the present invention is to provide a method by which it is possible to maintain and administer a switchboard at each site with a computer in the remote switching operation center which gets through a public switching telephone network (PSTN).

Another object of the present invention is to provide a method by which a loading file and a mail file are mutually transmitted between a computer in the remote switching operation center and a switchboard at each site.

Still another object of the present invention is to provide a method by which a data conversation function is performed between a computer in the remote switching operation center and a M&A terminal installed in the switchboard at each site.

BRIEF DESCRIPTION OF THE DRAWINGS

For a better understanding of the invention and to show how the same may be carried into effect, reference will now be made, by way of example, to the accompanying diagrammatic drawings, in which:

FIG. 2, comprising 2A and 2B, is a flow chart of remote terminal function according to the present invention;

FIG. 3, comprising 3A and 3B, is a flow chart of remote file transmission function according to the present invention;

FIG. 4, comprising 4A and 4B, is a flow chart of remote data conversation function according to the present invention;

FIG. 5, comprised of FIGS. (A)–(D), is a message frame format when the remote file is transmitted according to the present invention; and FIG. 6, comprising 6A and 6B, is a flow chart of file transfer protocol according to the present invention.

DETAILED DESCRIPTION OF THE PREFERRED EMBODIMENT

Now, a detailed description of the present invention will be made by referring to the drawings attached hereto.

Figure 1:
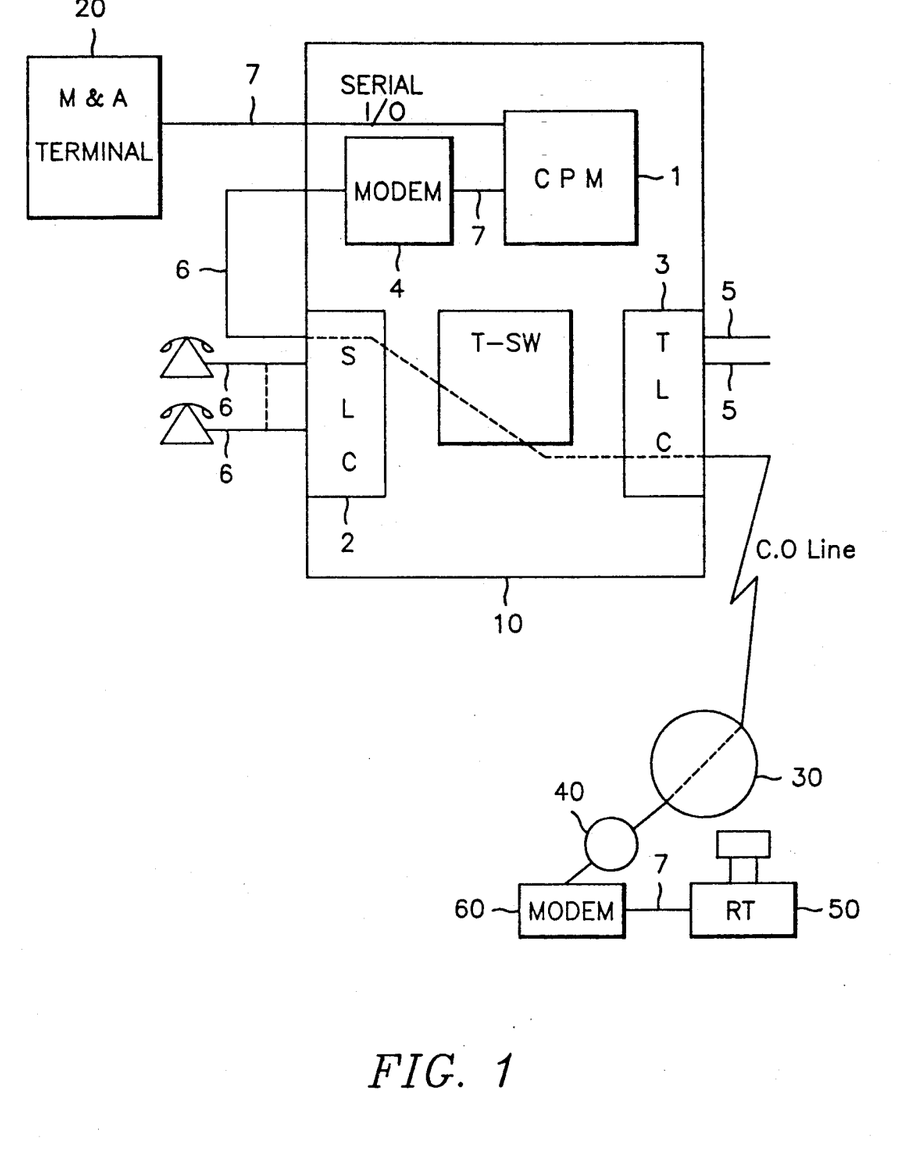
FIG. 1 is a system network diagram for executing the present invention.

FIG. 1 is a system network diagram for carrying out above objects of the invention according to the present invention, wherein a reference number 10 is an private branch exchange (PBX). The network is a known circuit which comprises a CPM (Central Processing Unit Module) 1, a SLC (Subscriber Line Circuit) 2, a TLC (Trunk Line Circuit) 3, a Modem 4, and a circuit necessary for the switching of T-SW (Time Switch). Reference number 20 is a M & A terminal. It performs MMC function with a switchboard. Reference number 30 is a PSTN (Public Switching Telephone Network). Reference number 40 is another private branch exchange (PBX). It provides a telephone route by being connected with said PSTN. It makes no difference if it is not comprised in the present invention. Reference number 50 is a RT (Remote Computer) equipped in the remote switching operation center. It performs the function of M & A terminal and a file transmission function. Reference number 60 is a modem. It modulates and demodulates the output/input transmission data of the RT 50 and transmits it to and receives it from the PSTN 30.

Figures 2A, 2B:
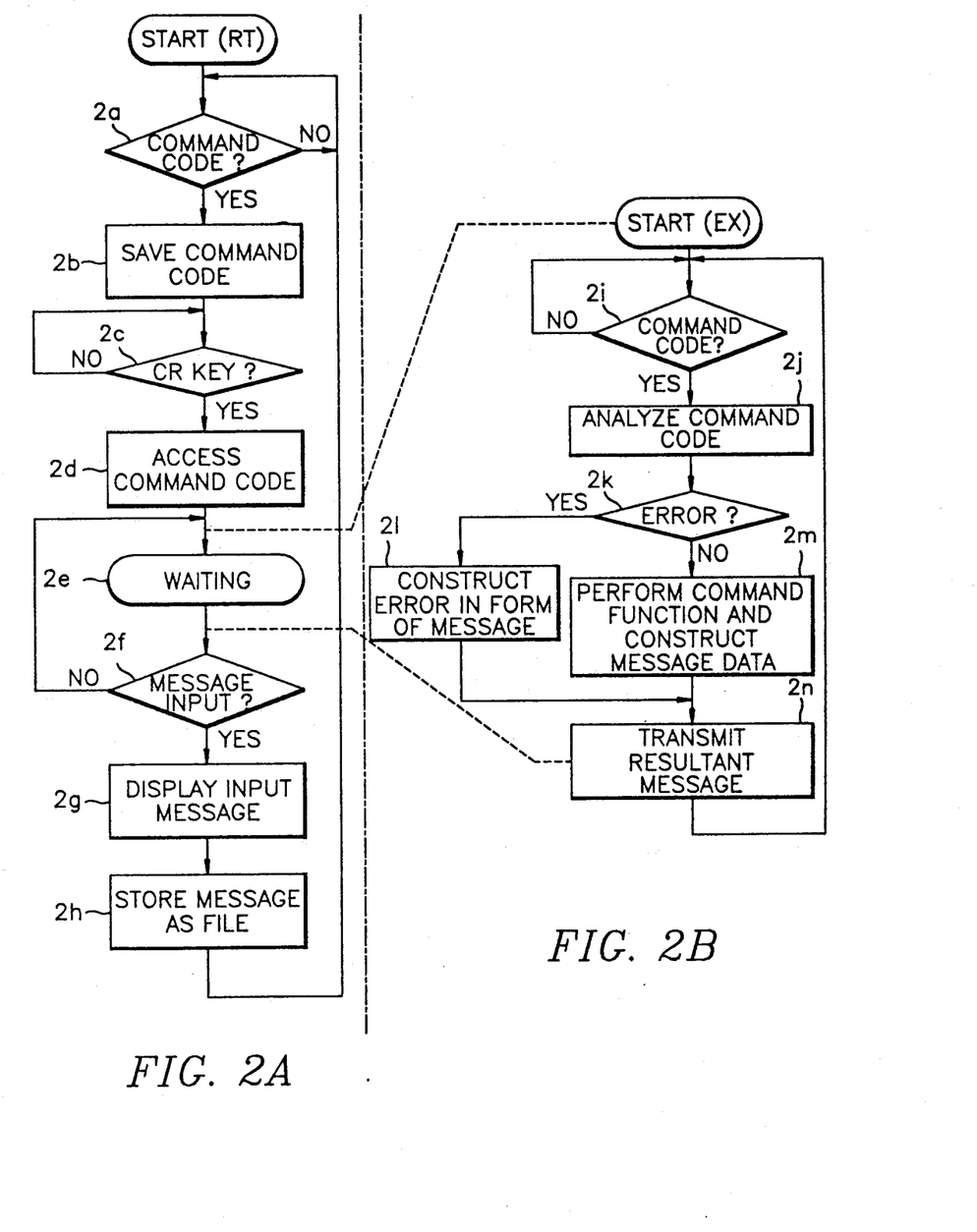

Now, referring to FIG. 2, it is a flow chart of remote terminal function according to the present invention. When the RT 50 inputs command data relative to maintenance and administration, it is inputted to the switchboard through the PSTN 30. The switchboard performs a function for input command and transmits a resultant message to the RT 50 through PSTN 30 and the RT 50 outputs the input data to its display and stores it as a file.

Figure 3A:
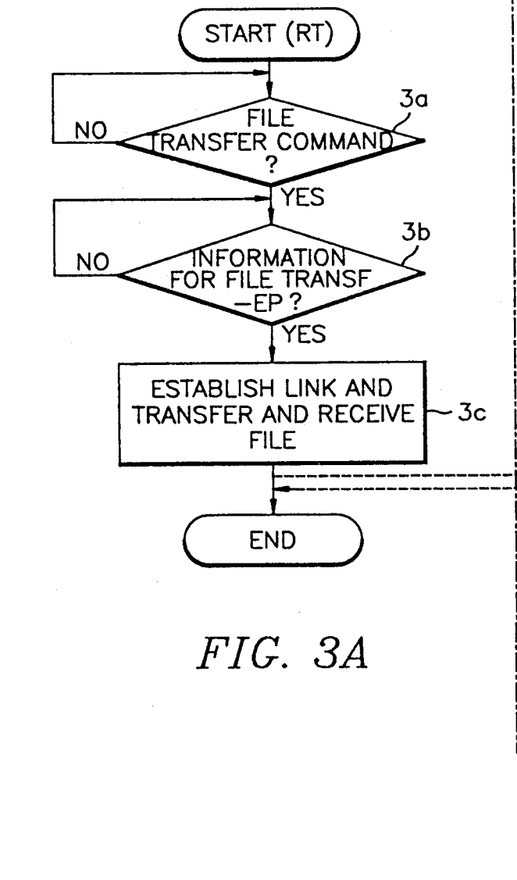
Figure 3B:
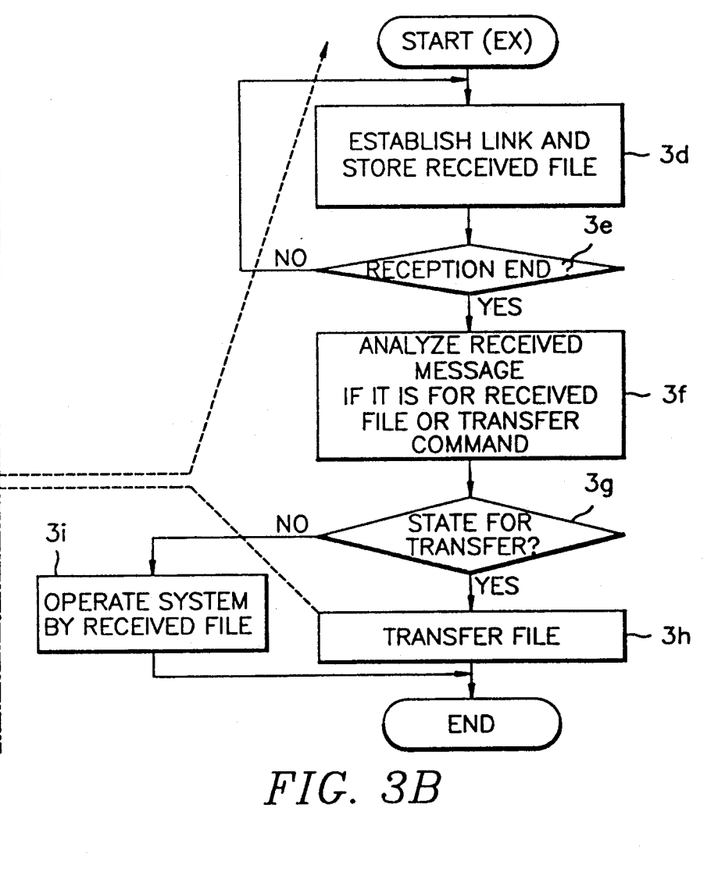

FIG. 3 is a flow chart of remote file transmission function according to the present invention. It illustrates the transmission of a required file by communication with protocol.

Figure 4A:
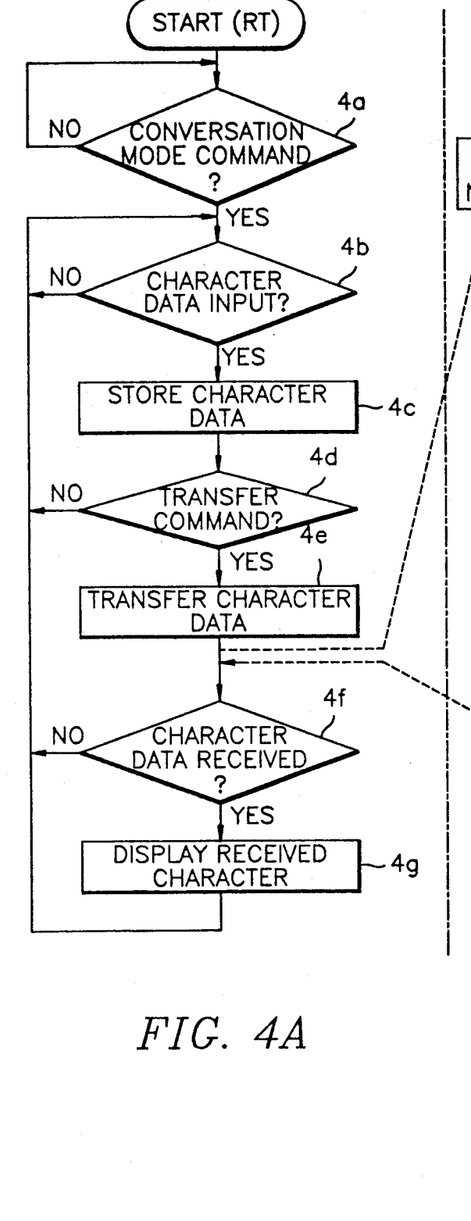
Figure 4B:
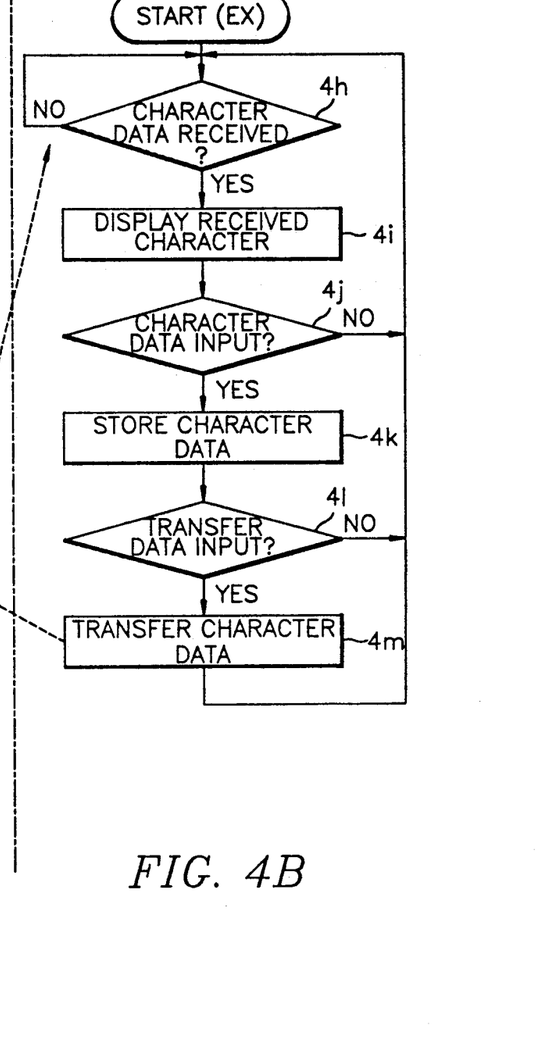

FIG. 4 is a flow chart of remote data conversation function according to the present invention. The conversation function is performed by the mutual transmission of character data between the M & A terminal installed in the PBX 10 and the RT 50.

Figure 5A:
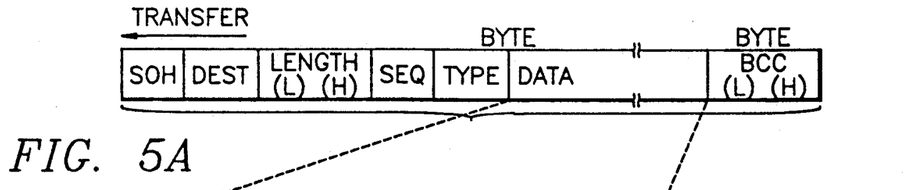
Figure 5B:
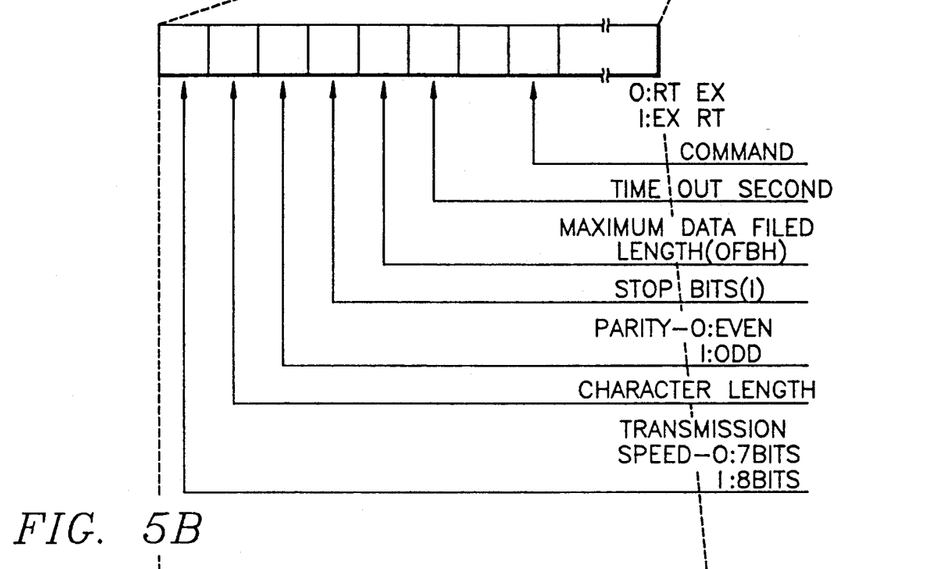

FIG. 5(A)-(D) illustrate data frame formats according to data frame formats and frame types according to the present invention. According to the preferred embodiment, the field description of FIG. 5(A) is as follows:

---

SOH (Start of Header): 1 byte. Transmission mode at 01H.
DEST (Destination Address): 1 byte. The contents are:
    00H: Remote Computer RT
    10H-EFH: Switchboard identification cord for each site.
    FFH: Broadcasting of switchboards at all sites
LENGTH (Frame Length):    The number of bytes from SEQ field to BCC field (Frame byte - 4 bytes)

---

As a binary value, the lower byte is transmitted first of all. The value at frames (Frame Type Number 00, 01, 06, 07) not provided with a data field is 4.

---

SEQ (Frame Sequence Number):
    This is the sequence number of frame which is transmitted by 1 byte. It uses the 0FH value of module. That is, the range of SEQ is 00H-0FH. The frame sequence number is independently operated by the remote computer RT and the switchboard at the site, respectively. If the frame sequence number is different, the receiver requests re-transmission as NAK (Negative Acknowledge).
TYPE (Frame Type): 1 byte. The contents are:
    00H: Acknowledge (ACK)
    01H: Negative Acknowledge (NAK)
    02H: Initiate
    03H: File Header
    04H: Data
    05H: End of File (EOF)
    06H: End of Transmission (EOT)
    07H: Error
DATA:    There are frame types provided with a data field; Frame 02, 03, 04, 07. In the event that frame types are frame 02, 03, 04 among data fields, they appear like B), C), D) of FIG. 5. If frame type is 07, the size of data field is 1 byte and its contents are as follows:
    00H: System Error
    01H: Initiate Parameter Error
    02H: Write Protect Error
    03H: Time Out Error
    04H: State Event Error
    05H: Abort
        If an error frame is produced, sender and receiver reset all the present switchboards and display the contents of error or stores it.
BCC (Block Check-Sum Code):
    This is the check-sum value accumulated by unit of byte from SOH field to the last of data field. It is available up only to 16 bits (word).

---

Figure 6A:
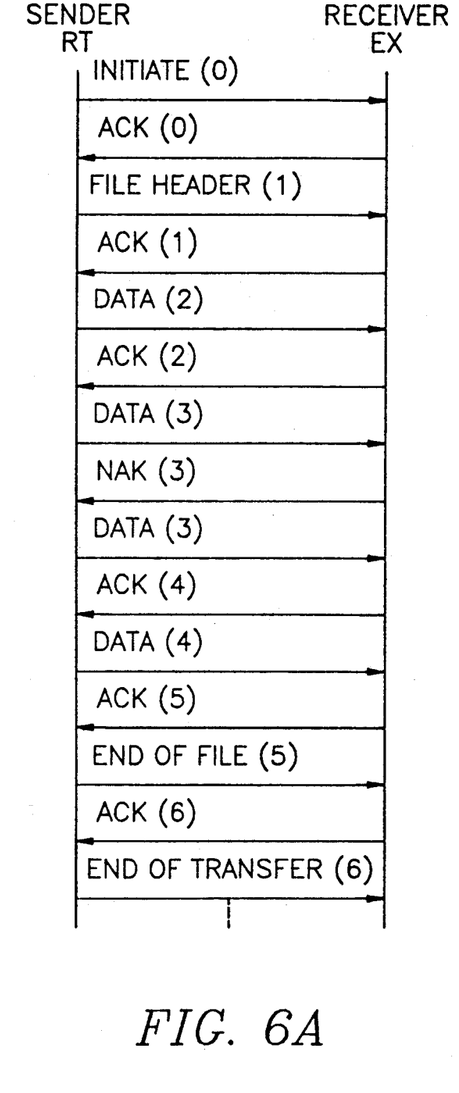
Figure 6B:
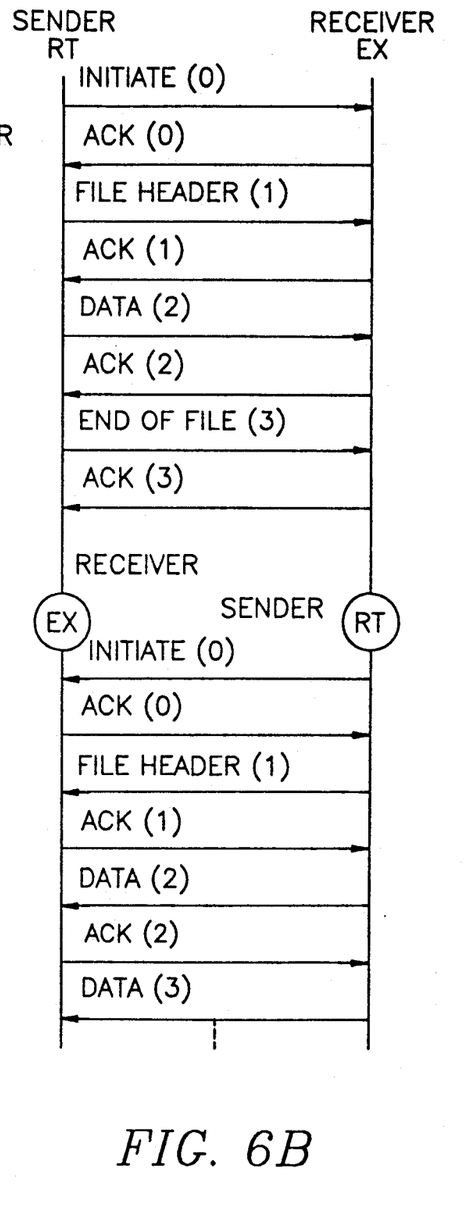

FIG. 6 is a flow chart of field transfer protocol according to the present invention. FIG. 6A is a flow chart which shows the transmission of file from the RT 50 to the PBX 10 and FIG. 6B is a flow chart which shows the transmission of file from the PBX 10 to the RT 50. The flow charts of FIGS. 6A and 6B use a stop-and-wait automatic request. The file transfer protocol starts from the initiate frame and terminates at the end of transmission (EOT) or at the error frame. Although both sites, namely, the RT 50 and the PBX 10, achieve transition to the initial condition of file transfer mode when transfer terminates at the error frame, transmission-end frame effects transition from file transfer mode to command mode.

Hereinafter, the operation of the present invention will be explained by way of example withe reference to the FIGS. 1 to 6. First of all, examples of basic forms and kinds of command words which can be executed by the M & A terminal 20 in FIG. 1 are given.

Basic forms and kinds of command words which can be executed by the M & A terminal is as follows;

---

Basic Forms (Example)
> (or #): Prompt
LSTN: Group Command
ATT: Sub-Command
432: Argument (factor, Variable)
; :Option (Option follows after ";")
Kinds of Options:    ;P(Print)
        ;C(Clear)
        ;a(append)
        ;d(delete)

---

Explanation of basic form (Example: >LSTN ATT 432;P) is given hereinbelow.

LSTN ATT (=List Station Attribute Data) command words are used to give a command that the data, which indicates a characteristic for a specific extension number, namely, 432, be outputted. Option ';P' is a command that an outputted message be printed concurrently with M & A terminal 20.

More specifically, the LSTN (List Station Data), which is a group command, means that the information of specific number must be outputted. ATT (Attribute), which is the sub-command, means a request for the basic characteristics of specific extension (namely, a kind of extension, a group with an extension allocated, the number of port with a corresponding extension connected, service class, etc.). Several sub-commands can be allocated to one group command. The numeral data '432', which is an argument, is the requesting specific extension telephone number. ';P' is an option and ';' is indicative of option and 'P' means print. In other words, it means that the basic characteristics of extension telephone number 432 must be outputted as a message to the M & A terminal and printed at the same time to the printer connected to the system.

Various commands are given hereinbelow to show the features of the invention, by way of example. (There being too many kinds of commands, only an example of a group command with several sub-commands allocated is given.)

| Group Command | Kinds of Commands Comment |
|---|---|
| LSYS (List System Data): | Request for output of information related to the whole range of the system. |
| RSYS (Revise System Data): | Request for revision of information related to the whole range of the system. |
| LSTN (List System Data): | Request for output of information related to a specific extension. |
| RSTN (Revise System Data): | Request for revision of information related to a specific extension. |
| LTRK (List Trunk Data): | Request for output of information related to a specific trunk line. |
| RTRK (Revise System Data): | Request for revision of information related to a specific trunk line. |
| LATC (List Attendant Console Data): | Request for output of information related to a specific relay. |
| RATC (Revise Attendant Console Data): | Request for revision of information related to a specific relay. |
| LDAT (List Data Line Data): | Request for output of information related to a specific data circuit. |

-continued

| Kinds of Commands | |
|---|---|
| Group Command | Comment |
| RDAT (Revise Data Line Data): | Request for revision of information related to a specific data circuit. |
| LCDA (List Call Detailed Accounting Data): | Request for output of information related to metering. |
| RCDA (Revise Call Detailed Accounting Data): | Request for revision of information related to metering. |
| LTRF (List Traffic Data): | Request for output of information related to various traffics. |
| TEST: | Request for various tests. |
| BLOK (Block System Resources): | Request for exclusion of various system resource services. |
| UBLK (Unblock System Resources): | Request for cancellation of excluding various system resource services. |
| CNTL (Control System): | Request for system control. |
| LERR (List Error History): | Request for output of fault information within the system. |

The kinds of command words which are used in said M & A terminal 20 as described hereinabove can all be used as they are in the RT 50.

The command word which is inputted by the M&A terminal and the command word which is inputted to the RT 50 are identical. When file name is additionally inputted after the command word inputted to the RT 50, the RT 50 stores the resultant message of command received from the PBX 10 as a file corresponding to a file name within the system. If the file name of command word inputted to the RT 50 is not inputted additionally, the resultant message received from the PBX 10 is outputted to the display of RT 50 and not stored as a file.

Now, in order to perform the M&A terminal function of the PBX 10 with the RT 50 in the system network as shown in FIG. 1, the following (a)-(g) conditions must be preceded.

(a) the RT 50 must run a software package for M & A.

(b) Thereafter, the RT 50 operator must input the modem 4 telephone number within the PBX 10 by using a keyboard.

(c) When the modem 4 telephone number of the PBX 10 is inputted as aforesaid, the RT 50 dials to access the modem 4 within the PBX 10 by controlling the modem 60. At this time, the dialing number of the modem 60 is delivered to the TLC 3 of PBX 10 through PSTN 30 and the dialing signal of the modem 60 inputted to the TLC (Trunk Line Circuit) 3 is connected to the internal modem 4 by the operation of PBX 10.

(d) When a carrier: answer tone which is outputted from the modem 4 of PBX 10 which inputs said dialing signal is delivered to the modem 60, RT 50 and PBX 10 are connected through modems 4 and 60.

(e) At this time, the RT 50 operator selects the remote terminal function as a menu.

(f) Thereafter, the operator inputs a log ID (Identification) and a password for the log-in of the PBX 10 in the RT 50.

(g) When the log ID and the password are inputted correctly, the RT 50 operator will use them as a terminal which can perform the M & A command of the PBX 10.

When the RT 50 is placed in a situation to perform remote maintenance and administration by such processes as aforesaid, it checks if a new command code will be inputted.

With reference to FIG. 2, if the inputted new command code is a command code for maintenance and administration of the PBX 10, the RT 50 judges that the command code was inputted in (2a) process and saves it in an internal storing range in (2b) process.

When the (2b) process is finished, the RT 50 checks in (2c) process if a transmission command (CR) is inputted. When the transmission command (CR) is inputted, the RT 50 accesses in (2d) process the command code saved in an internal storing range in the (2b) process and outputs it through the modem 60 and then stands ready for (2e) process of waiting. At the same time, the modem 60 modulates the command code from the RT 50 and transmits it to the TLC 3 of the PBX 10 through the PSTN 30.

On the other hand, the command code received by the TLC 3 is delivered to the modem 4 via a line 6 which gets through SLC (Subscriber Line Circuit) 2 by the time switching (T-SW) operation of the PBX 10. The modem 4 demodulates the command code transmitted from the modem 60 in a remote place and inputs it to CPM (Central Processing Module) 1 through RS-232C line.

Consequently, the CPM 1 which checks if the command code is inputted in (2i) process analyzes in (2j) process the command code which is inputted by inputting a command code from the modem 4. By the analysis of the command code made in said (2j) process, whether a group command and a sub-command are inputted satisfactorily and whether a factor (Argument) value is inputted within a given range are checked.

The CPM 1 which made an analysis of the received command code as aforesaid checks in (2k) process if an error is produced in the command code as analyzed. If an error is produced, its contents are constructed as a resultant message in (2l) process by being formatted in form of output. If the error is not produced, it performs a command function in (2m) process and constructs data by forming the result of performance into a message.

The resultant message constructed in form of a message in said (2l) process or 2(m) process is transmitted to the modem 4 and modem 60 through the PSTN 30 in (2n) process. It is demodulated in the modem 60 and inputted to the RT 50. At this time, the RT 50 judges that the message was inputted in (2f) process. The RT 50 which inputted the message displays it in (2g) process and stores it as a file in a disk in (2h) process. The (2m) process among the aforesaid processes performs a function for input command in the RT 50.

For example, when ">LSTN STS 432 LSTNSYS" is inputted, the PBX 10 accesses and outputs information of whether the extension number 432 is serviceable or out of order, information of whether it is engaged if serviceable, or information of which extension number is used by the other party if it is engaged.

If, under such remote terminal condition as aforesaid, the operator inputs a file transfer command for transition of switchboard condition to the keyboard (not illustrated) of RT 50 in order to perform the file transfer function, said command is transmitted to the CPM 1 through such routes as aforesaid. In this case, the PBX 10 changes into standing ready for a protocol for file transfer and the RT 50 gets out of remote terminal condition and displays the menu. Then, the operator of the RT 50 selects a menu for file transfer, so that the file transfer function comes to performance.

The RT 50 judges whether the file transfer command is inputted in (3a) process of FIG. 3 and checks if information for file transfer is inputted in (3b) process, while displaying the menu for the file transfer. The information for the file transfer comprises data such as the kind and the name of file, and destination address to be stored within the PBX 10.

The reason that a file is transferred is that it is necessary to update the installation data which each switchboard (site) has, in the RT 50 of remote maintenance center, and transfer it to the switchboard which is a site and then down-load it. The installation data each site has is used when it is again transferred from the RT 50 to the switchboard in case the data within the site switchboard system is deleted after it is transferred to the RT 50 of remote maintenance center and kept for back-up.

Files are classified largely into a load file and a mail file. The load file means installation data or program, which is to be executed by being loaded in the memory within the switchboard system. The mail file is a means for communication between operators at the sites where a switchboard of remote maintenance center is installed. It sets up as a mail box the specified memory range which the operators of remote maintenance center and switchboard site can access and stores message therein.

When said information for the file transfer is inputted, the RT 50 constructs the information necessary for file transfer in (3c) process into the data frame format like FIG. 5 and establishes a link by making those formats the protocols like (A) and (B) of FIG. 5 and transfers and receives a file.

In the initial process of FIG. 6A, the RT 50 exhibits Initiate by loading the value of 02H on the TYPE (frame type) and transfers data like (B) of FIG. 5. Thereafter, it transfers a file by changing data, as frame type (TYPE) is described in the data frame format of (D) of FIG. 5, when the PBX 10 responds to the file in the manner of stop-and-wait auto request.

On the other hand, the PBX 10 which moved into file transfer condition establishes a link by the protocol and stores the received file in the memory, in (3d) process of FIG. 3, and checks if reception is finished in (3e) process. If reception is finished, it analyzes if the received message is a received file or a command which makes a request for the file transfer to the RT 50 in (3f) process and checks if the present request condition is a state of transfer in (3g) process. If it is not the state of transfer, the PBX 10 operates the system by the received file in (3i) process.

If the information for the file transfer to the RT50 is to be preserved for back-up by receiving the installation data of the PBX 10, the value of 02H and not of 01H will be transferred by being loaded on the command which is the 1 byte region of Initiate Frame like (B) of FIG. 5. At this time, the protocol achieves file transfer by the flow of FIG. 6(B).

Figure 5C:
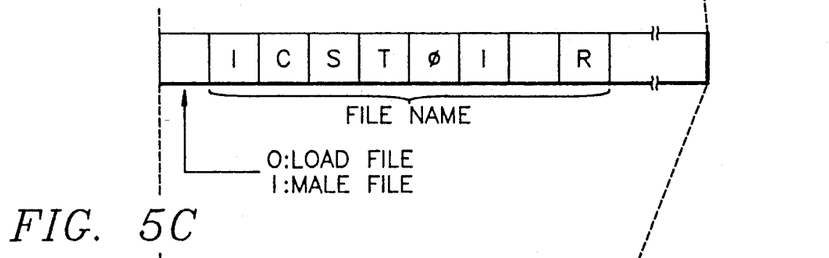
Figure 5D:
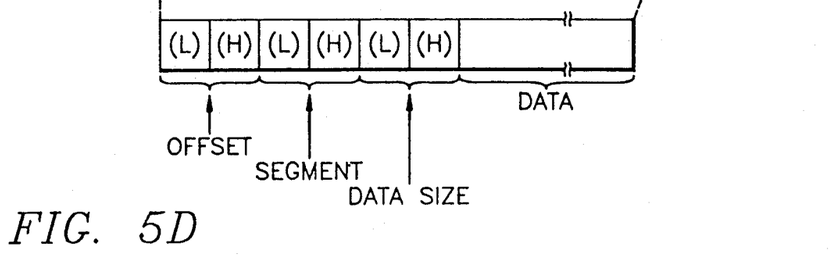

In the Initiate (0) of FIG. 6B, the value of command among the fields of initiate frame data is transferred with 02H as described hereinbefore. When the PBX 10 receives it, it transfers a response ACK (0) and the RT 50 which received it transfers a file header of (C) of FIG. 5. At this time, the PBX 10 transfers a response to file header reception to the RT 50.

The RT 50 which received a response to file header reception transfers to the field of data frame like (D) of FIG. 5 the segment of memory and the address of offset which require file transfer from the PBX 10 to the RT 50 and the value of data size which is to be transferred. The PBX 10 which received said data saves it in the memory and the (3d) process of FIG. 3 transfers a response ACK (2) to the RT 50. When the RT 50 receives it, it transfers data which indicates the end of file.

The PBX 10, judging (3e) that reception of file is finished, sends a response thereto to the RT 50. A few seconds later, the RT 50 and the PBX 10 will go through the (3f) process in which they change reception and transmission with each other.

Thereafter, the PBX 10 accesses data according to file transfer information and transfers a file to the RT 50 by the protocol in a state of flow for transfer as shown in FIG. 6B. Then, the RT 50 which receives the file transferred from the PBX 10 stores it as a file in the range like a disk.

On the other hand, if the operator inputs a remote data conversation function command to the keyboard under the remote terminal condition as described hereinabove, the RT 50 transfers a conversation mode command code to the PBX 10. The CPM 1 of the PBX 10 receives this command and changes the system into a conversation mode and checks in (4h) process if character data is received. At this time, the RT 50 checks in (4b) process if the character data is inputted from the keyboard.

When the character data is inputted in said (4b) process, it is stored in an internal memory in (4c) process. If a command key for transfer is inputted in (4d) process, the RT 50 transfers in (4l) process the character data stored in the memory to the PBX 10 through the modem 60 and PSTN 30. The RT 50 which transferred the character data as aforesaid checks in (4f) process through the modem 60 if the character data is received. When the character data is not received, the RT 50 repeats its operation from said (4b) process. When the character data is received, the RT 50 displays the received character data through its monitor (Virtual Display Unit) in (4g) process.

Meanwhile, the CPM 1 of the PBX 10 which was checking the character reception condition outputs data to the M&A terminal 20 for displaying to its monitor in (4i) process when it is transferred and inputted from the RT 50. The CPM 1 which displayed the character as aforesaid checks in (4j) process if the character data is inputted from the M & A terminal 20. When the character data is inputted, the CPM 1 stores it in the internal memory in (4k) process and checks in (4l) process if transfer key data is inputted from the M & A terminal 20. When transfer key data is inputted, the CPM 1 transfers in (4m) process the character data stored in an internal memory to the RT 50 through modem 4 and PSTN 30, thereby enabling it to execute a conversation mode as mutual character data.

As described hereinbefore, the present invention has the following merits in that it can execute the maintenance and administration of the PBX connected to the PSTN as the computer of remote operation center which gets through the PSTN.

1) It is economical by reason that it is not necessary for an operator to be stationed permanently at each switchboard site or it is less necessary for an operator to be dispatched to each switchboard site from the after-service center.

2) A professional operator in the remote operation center can maintain and administer those PBXs located at several sites through a computer for exclusive use, so that professionalization can be promoted and a common equipment can be utilized.

3) Prompt support can be given to each site not by dispatching a professional operator thereto but by accessing the PBX which ran into a problem through a computer in the remote operation center.

4) The reliability of the PBX can be promoted by making a regular automatic diagnosis of the PBX at each site by utilizing automatic preengagement function by a timer through a computer in the remote operation center.

5) It is easy to manage the version in an efficient way because the software of the PBX at each site is kept and managed in the remote operation center.

What is claimed is:

1. A remote maintenance and administration method in a switchboard having a maintenance and administrative terminal, said switchboard being remotely maintained and administered by a remote computer equipped in a remote maintenance and administration center, said method comprising:

a first step which checks for an input command at said remote computer and determines whether said input command is any one of a maintenance and administration command, a file transfer command, and a conversation mode command;

a second step which saves the input command in a register as a result of the input command in said first step being determined to be said maintenance and administration command and checks for input of a transmission command signal;

a third step which transfers the maintenance and administration command as a command code to said switchboard in response to said transmission command key signal when the input command is determined to be the maintenance and administration command as a result of the check in said first step, and said remote computer operates in a standby mode until a resultant message is received from said switchboard;

a fourth step which displays the resultant message and stores the message as a file when the resultant message for a maintenance and administration command code is received from the switchboard;

a fifth step in which said remote computer checks for information for file transfer to said switchboard being input when the input command is determined to be said file transfer command in said first step;

a sixth step in which said remote computer establishes a link with the switchboard by constructing information necessary for file transfer into a data format according to a file transfer protocol for transferring or receiving a file when the information for file transfer has been input in said fifth step;

a seventh step which stores character data input at said remote computer when the input command is determined to be the conversation mode command in said first step; and an eighth step which transfers the character data to the switchboard when a transfer key signal is input to said remote computer after said seventh step is performed and said remote computer displays character data received from the switchboard.

2. The remote maintenance and administration method as claimed in claim 1, said third step further comprising the steps of:

checking, at said switchboard, for input of said command code transferred from said remote computer;

analyzing said command code, when said checking step obtains a positive result, to determine whether a group command and a sub-command of said command code are input satisfactorily and whether a factor value is input within a predetermined range;

checking whether an error was produced during said analyzing step;

constructing an error message if said error was produced; and transmitting said error message to said remote computer as said resultant message.

3. The remote maintenance and administration method as claimed in claim 2, further comprising the steps of:

performing the maintenance and administration command if no error was produced;

constructing a performance message indicative of a result of said performing step; and transmitting said performance message to said remote computer as said resultant message.

4. The remote maintenance and administration method as claimed in claim 1, said sixth step further comprising the steps of:

said switchboard establishing a link with said remote computer, said link being influenced by said file transfer protocol and storing a received file transmitted from said remote computer;

analyzing said received file to determine whether it was a received file or a message requesting the switchboard to transfer a file to the remote computer; and operating the switchboard in response to the received file if the received file was not a message requesting the switchboard to transfer a requested file to the remote computer.

5. The remote maintenance and administration method as claimed in claim 4; further comprising the step of:

transferring said requested file to said remote computer if the received file was a message requesting the switchboard to transfer a requested file to the remote computer.

6. The remote maintenance and administration method as claimed in claim 1, said seventh step further comprising the steps of:

transferring said conversation mode command to said switchboard for enabling said switchboard to operate in a conversation mode; and checking, at said switchboard, for reception of said character data transferred from said remote computer.

7. The remote maintenance and administration method as claimed in claim 6, said eighth step further comprising the steps of:

checking, at said switchboard, for reception of said character data transferred from said remote computer and displaying said character data, if received from said remote computer, on a monitor of said maintenance and administration terminal;

checking, at said switchboard, for input of character data from said maintenance and administration terminal and storing said character data, if input from said maintenance and administration terminal, in an internal memory of said switchboard; and transferring said character data from said internal memory to said remote computer when transfer key data is input to said switchboard from said maintenance and administration terminal.

8. The remote maintenance and administration method as claimed in claim 1, said eighth step further comprising the steps of:
   displaying said character data, if received from said remote computer, on a monitor of said maintenance and administration terminal;
   checking, at said switchboard, for input of character data from said maintenance and administration terminal and storing said character data, if input from said maintenance and administration terminal, in an internal memory of said switchboard; and
   transferring said character data from said internal memory to said remote computer when transfer key data is input to said switchboard from said maintenance and administration terminal.

9. A remote maintenance and administration method in a switchboard having a maintenance and administration terminal, said switchboard being remotely maintained and administered by a remote computer equipped in a remote maintenance and administration center, said method comprising:
   a first step in which said switchboard analyzes an input command transmitted from the remote computer for determining whether said input command is any one of a maintenance and administration command, file transfer command and a conversation mode command, and in response to indication of said command, for performing transition to a terminal mode for a maintenance and administration mode, a file transfer mode or a conversation mode;
   a second step in which said switchboard checks for an error in said command when said command is indicative of said maintenance and administration mode in said first step;
   a third step in which said switchboard constructs an error message into a resultant message when the received command, indicative of said maintenance and administration mode, produced an error in the second step, and transmits said resultant message to the remote computer and, when no error is produced, performs a function according to the transmitted command, constructs a performance message and transmits said performance message as said resultant message to the remote computer;
   a fourth step in which said switchboard establishes a link with the remote computer, by constructing information necessary for file transfer into a data formal according to a file transfer protocol and stores a message received from said remote computer when the command transmitted from said remote computer is indicative of said file transfer mode in said first step;
   a fifth step which determines whether the message received in the fourth step is reception file data or a command requesting a file transfer;
   a sixth step which transfers a file from the switchboard to the remote computer when said received message is the command requesting a file transfer in the fifth step or the switchboard operates in response to instructions in the reception file data when the received message is said reception file data;
   a seventh step in which said remote computer displays character data to be transferred that is input from a keyboard of said remote computer when the command in the first step is determined to be indicative of the conversation mode and stores the character data; and
   an eighth step which transfers the stored character data to the switchboard when a transfer key signal is input after the seventh step is performed.

10. An apparatus for remote maintenance and administration in a switchboard of a private branch exchange; said apparatus comprising:
   a remote computer for receiving one of a maintenance and administration command, a file transfer command, and a conversation mode command as a command code, for determining whether said command code is said maintenance and administration command, said file transfer command, or said conversation mode command, said remote computer storing said command code in an internal storage means if said command code is said maintenance and administration command and providing said command code stored in said internal storage means for output;
   a first modem for modulating said command code provided for output by said remote computer and transmitting the modulated command code through a public switching telephone network to a trunk line circuit of said private branch exchange;
   a second modem for demodulating the modulated command code and for providing the demodulated command code to a central processing module at said switchboard;
   said central processing module checks for input of said demodulated command code and analyzes said demodulated command code, if input, to determine if said demodulated command code is input satisfactorily;
   said central processing module produces an error message if the demodulated command code is not input satisfactorily and transmits said error message as a resultant message to said second modem;
   said second modem modulates said resultant message for transmission to said first modem;
   said first modem demodulates said resultant message and transmits said demodulated resultant message to said remote computer;
   said remote computer displays said demodulated resultant message and stores said demodulated resultant message as a file;
   said remote computer determining if information for file transfer to said switchboard is input when said remote computer determines said command code is said file transfer command;
   said remote computer establishing a link with the switchboard, by constructing information necessary for file transfer into a data format according to a file transfer protocol, for transferring or receiving file information when said remote computer determines said information for file transfer has been input;
   said central processing module establishing a link with said remote computer, by constructing information necessary for file transfer into a data format according to said file transfer protocol, and storing said file information transmitted from said remote computer;
   said central processing module analyzing said stored file information to determine whether the file information is a transferred file from said remote computer or a message requesting the switchboard to transfer a file to said remote computer; and said central processing module operating said switchboard in response to instructions in said transferred file if the file information was determined to be said transferred file from said remote computer, or transmitting said file requested by said message to said remote computer;

said remote computer transmitting said conversation mode command to said switchboard if said remote computer determines said command code is said conversation mode command;

said remote computer storing character data input from a keyboard of said remote computer and transmitting said stored character data to said switchboard in response to a transfer command signal;

a maintenance and administration terminal at said switchboard for inputting character data;

said central processing module displaying character data received from said remote computer;

said central processing module storing character data input from said maintenance and administration terminal and transmitting said stored character data to said remote computer in response to a transfer command key signal; and said remote computer displaying character data received from said central processing module.

11. The apparatus as claimed in claim 10, further comprising:

said central processing module performing a command function of said demodulated command code if said demodulated command code is input satisfactorily and constructs a performance message indicative of a result of the command function performed; and said central processing module transmitting said performance message as said resultant message to said second modem for transmission to said remote computer.

* * * * *

UNITED STATES PATENT AND TRADEMARK OFFICE
CERTIFICATE OF CORRECTION

PATENT NO. : 5,261,061
DATED : November 9, 1993
INVENTOR(S) : Cheol Ju

It is certified that error appears in the above-indentified patent and that said Letters Patent is hereby corrected as shown below:

Column 3,

Line 23,    change "SEO" to --SEQ--;

Line 67,    change "withe" to --with--; and Column 11,     Line 50,    change "formal" to --format--.

Signed and Sealed this

Sixth Day of September, 1994

Attest:

BRUCE LEHMAN

*Attesting Officer*    *Commissioner of Patents and Trademarks*